US006591444B1

United States Patent
Hoshino (12) United States Patent
(10) Patent No.: US 6,591,444 B1
(45) Date of Patent: Jul. 15, 2003

(54) WIPER APPARATUS

(75) Inventor: Takashi Hoshino, Isesaki (JP)

(73) Assignee: Mitsuba Corporation, Kiryu (JP)

( * ) Notice: Subject to any disclaimer, the term of this patent is extended or adjusted under 35 U.S.C. 154(b) by 205 days.

(21) Appl. No.: 09/661,400

(22) Filed: Sep. 13, 2000

(30) Foreign Application Priority Data

Sep. 13, 1999 (JP) .......................................... 11-258910

(51) Int. Cl.$^7$ ................................ B60S 1/24; B60S 1/06
(52) U.S. Cl. ...................... 15/250.3; 15/250.27; 74/42; 74/43
(58) Field of Search .......................... 15/250.31, 250.3, 15/250.27, 250.21, 250.23; 74/42, 43

(56) References Cited

U.S. PATENT DOCUMENTS

| | | | | |
|---|---|---|---|---|
| 1,854,074 A | * | 4/1932 | Slingerland et al. | ..... 15/250.21 |
| 3,633,238 A | * | 1/1972 | Parker | ..... 15/250.27 |
| 4,245,369 A | * | 1/1981 | Clem | ..... 15/250.23 |
| 4,707,876 A | * | 11/1987 | Carducci | ..... 15/250.23 |
| 6,105,199 A | * | 8/2000 | Irikura | ..... 15/250.21 |

* cited by examiner

Primary Examiner—Gary K. Graham
(74) Attorney, Agent, or Firm—Oliff & Berridge, PLC (57) ABSTRACT

The invention relates to a wiper apparatus, which can effectively regulate overrun of a wiper arm, wherein the base end portion of the main wiper arm 8 is pivotally supported at the vehicle body side via a pivotal axis 8a so as to rock, the wiper arm 8 and one end of the first link 10 are pivotally supported so as to rock, via the first pivotal axis 8b, at an intermediate position at the tip end side of the corresponding axis 8a, one end of the second link 11 is pivotally supported, via the second pivotal axis 10a, at the other end of the first link 10, and the other end of the second link is connected integral with the main wiper axis 5 corresponding to the third pivotal axis, and wherein the main wiper arm 8 is set so as to be located at the upper reversing position when the first pivotal axis 8b, the second pivotal axis 10a and main wiper axis (third pivotal axis) 5 are positioned in the same straight line in order.

11 Claims, 7 Drawing Sheets

WIPER APPARATUS

FIELD OF THE INVENTION

The present invention relates to a wiper apparatus to be attached to a vehicle such as a truck, a bus, and an automobile, etc.

BACKGROUND OF THE INVENTION

Generally, in this type of a wiper apparatus, there is one in which a wiper arm equipped with a blade at its tip end is constructed so as to reciprocatorily rock between upper and lower reversing positions on a window surface in order to wipe the window surface. Such a type of a wiper apparatus is devised so that a drive axis is integrally mounted at the base end portion of a wiper arm, and the wiper arm is caused to reciprocate and rock by rotating the corresponding drive axis clockwise and counterclockwise in interlock with drive of a wiper motor.

And, in this case, since it is requested that the wiping area of the blade based on reversing reciprocation of the wiper arm is made as wide as possible, the rotating range of the drive axis is determined with various conditions such as an area of a window, interference between the wiper arm and the blade attached to the tip end of the corresponding wiper, interference between the wipers adjacent thereto, etc., taken into consideration while meeting the abovementioned condition.

SUMMARY OF THE INVENTION

The wiper arm is devised so as to be able to change over from a high-speed motion to a low-speed wiping motion or vice verse to deal with the amount of precipitation. However, the wiping action of the wiper arm is constructed so as to rock on the basis of clockwise and counterclockwise rotation of the drive axis directly connected to the base end thereof. Therefore, in a case where wind pressure changes, the friction coefficient with the window surface changes, or the inertia force of the wiper arm is increased by changeover of the moving speed of the wiper arm to its high-speed side, the wiper arm may be subjected to overrun by which the wiper arm moves beyond the reversing position upon receiving of the abovementioned changes and large inertia force. In such a case, unless the overrun is taken into consideration as the moving range of the drive axis, the blade is brought into contact with a pillar and may overrun from the window surface. To prevent this, a problem occurs in that the wiping area needs to be reduced. This is an object of the invention.

The present invention was made in view of the situations described above and was developed to solve the abovementioned problem. It is therefore an object of the invention to provide a wiper apparatus equipped with a wiper arm reciprocating and reversing mechanism having a blade at its tip end and reciprocating and reversing between the upper and lower reversing positions using a pivotal axis, which is axially supported at the vehicle body side so as to rock, as a fulcrum point, wherein the wiper arm reciprocating and reversing mechanism the first link, one end of which is pivotally supported at the first pivotal axis provided so as to rock integral with the wiper arm, and the second link, one end of which is pivotally supported at the other end of the first link via the second pivotal axis and the second axis of which is pivotally supported at the vehicle body side via the third pivotal axis, and wherein reciprocating and reversing actions of the abovementioned wiper arm are carried out by a link motion of the second pivotal axis using the third pivotal axis as a fulcrum, and a rocking motion of the abovementioned wiper arm to the maximum extent of movement is carried out by a linked rocking in which the first, second and third pivotal axes are positioned in the same straight line.

And, by the abovementioned structure, while the overrun of the wiper arm is regulated, the wiping area can be established to a large extent.

In such a structure, the first pivotal axis of the invention may be provided at an intermediate portion of the wiper arm.

In such a structure, the first pivotal axis of the invention may be provided at an auxiliary link that turns around integral with the wiper arm.

Also, in such a structure, a wiper arm according to the invention is constructed so that the wiper arm is positioned at the maximum rocking end at the upper reversing position where the first, second and third pivotal axes are located in the same straight line in order, and is positioned at the minimum rocking end at the lower reversing position where the first, third and second pivotal axes are located at the lower reversing position in order.

Still further, in such a structure, a wiper arm according to the invention is constructed so that the maximum rocking position, where the first, second and third pivotal axes are located in the same straight line, is established as its upper reversing position, and the moving speed is decelerated when approaching the corresponding upper reversing position, whereby the inertia load may be reduced when the wiper arm is reversed at the upper reversing position, overrun can be eliminated, and an impact due to reversing can be reduced.

BRIEF DESCRIPTION OF THE INVENTION

DETAILED DESCRIPTION OF THE INVENTION

Next, a description is given of a first embodiment of the invention with reference to the accompanying drawings FIG. 1 through FIG. 5.

In these drawings, reference number 1 indicates a wiper motor that constitutes a wiper apparatus, wherein the base end portion of a crank arm 2 is integrally connected to an output axis 1*a* of the corresponding motor 1, and the base end portion of a main link rod 3 is pivotally connected to the tip end portion of the corresponding crank arm 2 so as to freely rotate. The base end portion of a sub link arm 4 is pivotally supported at the tip end portion of the abovementioned main link rod 3, and further, the base end portion of the sub link rod 3a is pivotally supported at the base end portion of the sub link arm 4. The base end portion of the main link arm 4a is pivotally supported at the tip end portion of the corresponding link rod 3a. And, the base end portions of the main and sub wiper axes (drive axes) 5 and 6, which are rotatably supported at the vehicle body side, are integrally connected to the tip end portion of the respective main and sub link arms 4 and 4a. And, the crank arm 2, main and sub link rods 3 and 3a, and main and sub link arms 4 and 4a makes a link motion in line with rotation and drive of the wiper motor 1, and, based on that, the main and sub wiper axes 5 and 6 are caused to rotate clockwise and counterclockwise in a range of rotation established in advance.

Figure 1:
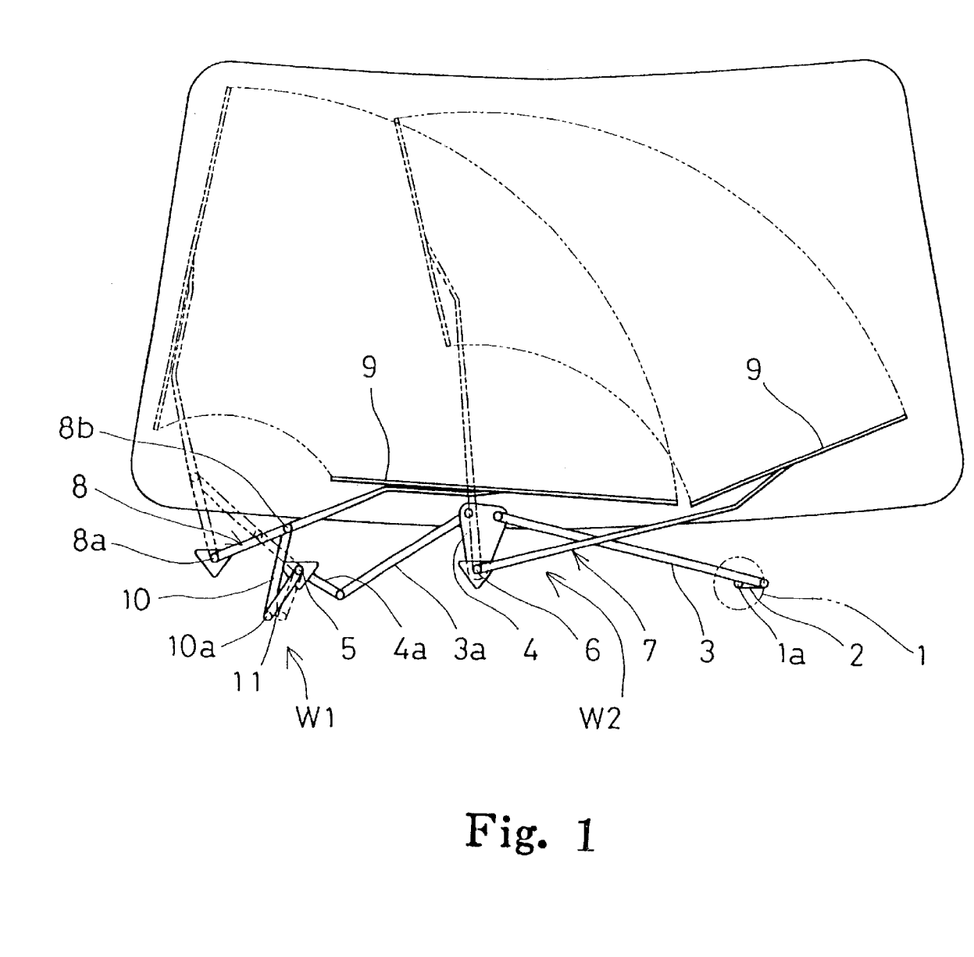
FIG. 1 is a front elevational view showing the entirety of a wiper apparatus.
Figure 2:
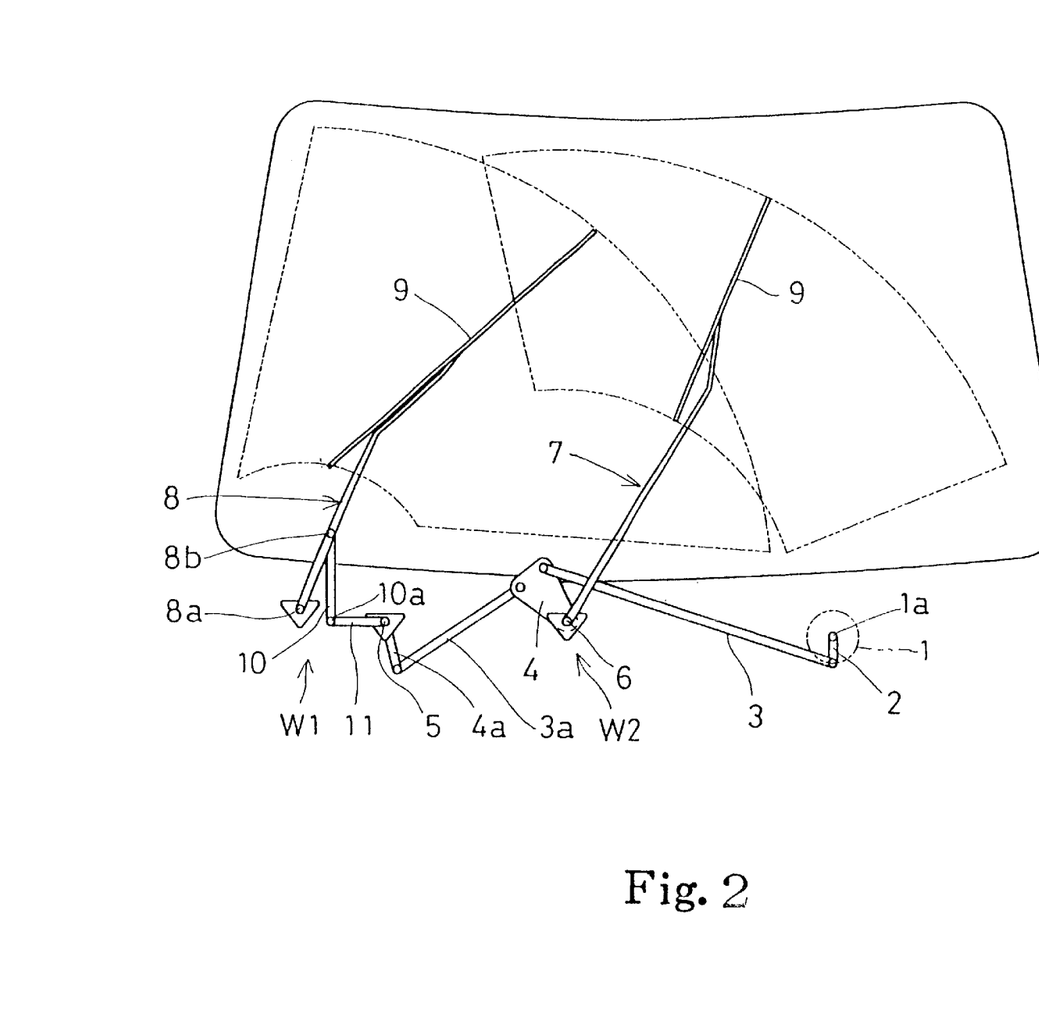
FIG. 2 is a front elevational view of the main wiper apparatus in a rocking motion of a wiper arm.
Figure 3:
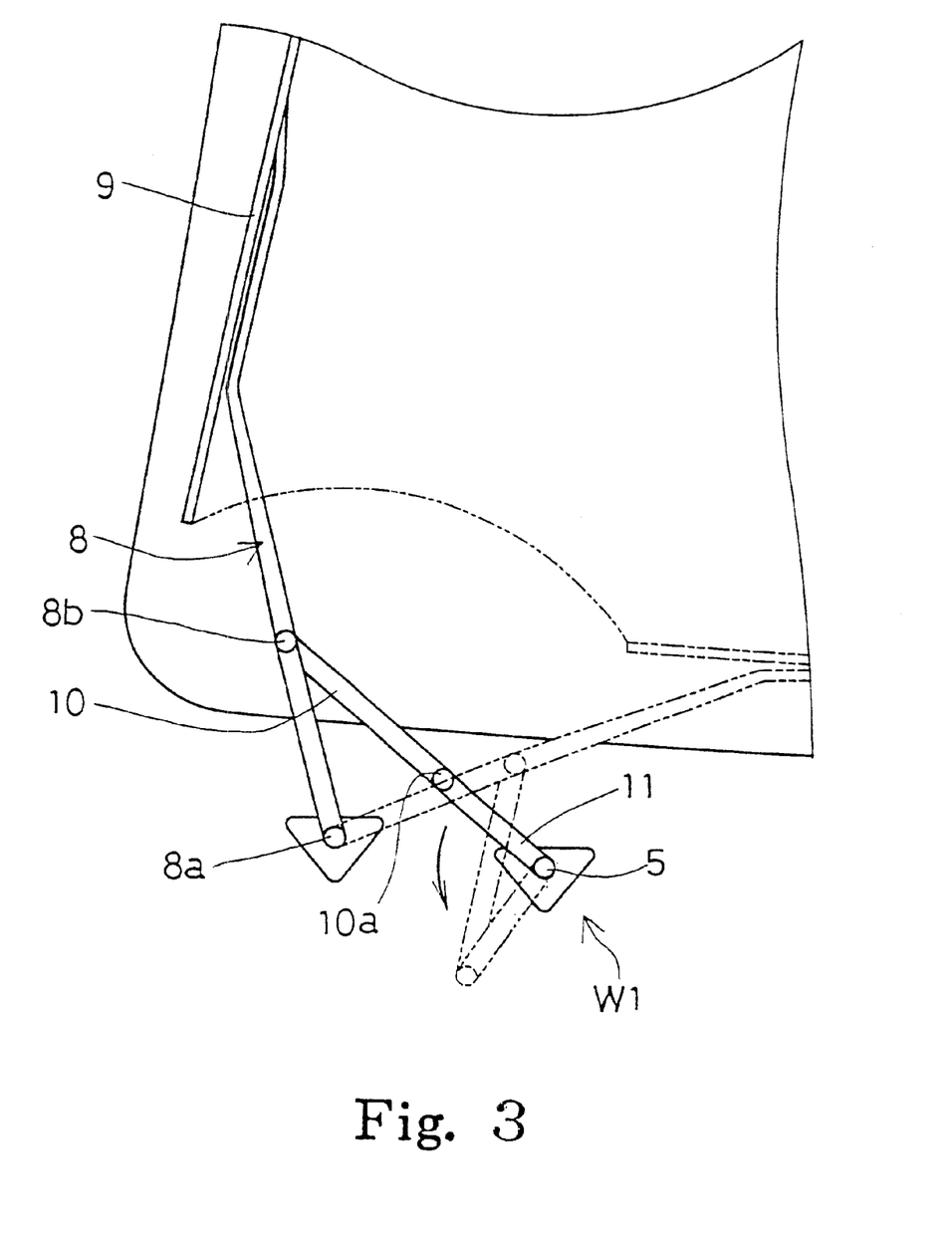
FIG. 3 is an enlarged front elevational view explaining actions of the main wiper apparatus.
Figure 4:
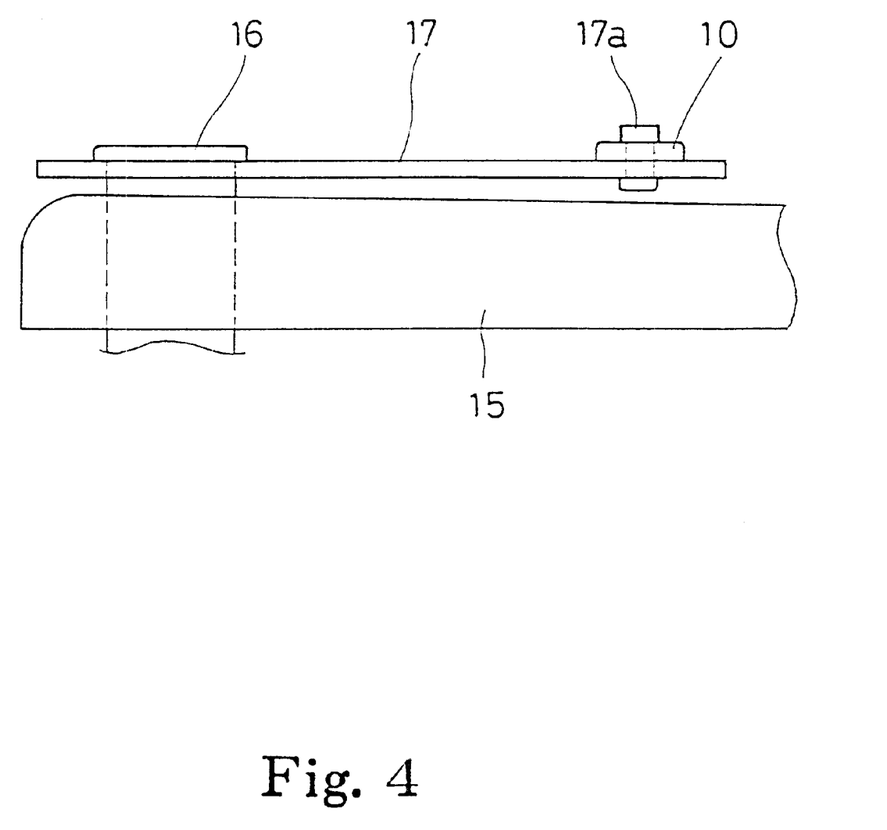
FIG. 4 is a partial side elevational view of a wiper arm according to the second embodiment.

And, the base end portion of a sub wiper arm 7 of a general construction is connected to the tip end portion of the sub wiper axis 6 of the assistant driver's seat disposed at the right side when facing FIG. 1, thereby constructing a sub wiper apparatus W2. On the other hand, the main wiper arm 8 is connected, via a rocking mechanism (reciprocating and reversing mechanism) in which the invention is embodied, to the tip end portion of the main wiper axis 5 disposed at the left side when facing the drawing, thereby constructing the main wiper apparatus 1. Also, reference number 9 indicates a blade that is detachably attached to the tip end portion of the main and sub wiper arms 7 and 8.

Here, the main wiper arm 8 is constructed so that its base end portion is pivotally supported at the vehicle body side via a pivotal axis 8a so as to rock, the first pivotal axis 8b is turnably provided at the tip end side of the pivotal axis 8a, that is, at the position being an intermediate portion of the wiper arm 8, which differs from the pivotal supporting position of the pivotal axis 8a. And, one end portion of the first link 10 is pivotally supported via the first pivotal axis 8b so as to rock while one end of the second link 11 is pivotally supported at the other end of the corresponding first link 10 so as to rock. Further, the tip end portion of the main wiper axis 5 is integrally pivotally supported at the other end of the second link 11. In this case, the main wiper axis 5 is a member to pivotally support the other end of the second link 11 at the vehicle body side, which corresponds to the third pivotal axis. In addition, in the present embodiment, the second link 11 rocks to or turns around the upper position shown by solid lines in FIG. 3 and the lower position shown by hypothetical lines therein, while using the main wiper axis 5 as a fulcrum, in line with clockwise and counterclockwise movement of the main wiper axis 5 corresponding to the third pivotal axis by drive of the wiper motor shaft 1. In line therewith, the first link 10 is established so as to make a link motion in which the first link 10 pushes and pulls an intermediate portion of the main wiper arm 8. Thereby, the main wiper arm 8 is devised so as to reciprocate and rock between the upper reversing position (shown by hypothetical lines in FIG. 1) and the lower reversing position (shown by solid lines therein) while using the pivotal axis 8a as a fulcrum, whereby a reciprocatory reversing mechanism (a rocking mechanism) according to the invention is thus constructed.

Also, as described above, the main wiper arm 8 is set so that, when the relationship between the first link 10 and the second link 11 becomes such that the first pivotal line 8b, the second pivotal axis 10a and main wiper axis 5 are arranged in almost the same straight line diagonally upward to downward, that is, a substantial link length between the first link 10 and the second link 11 (the distance between the first pivotal axis 8b and the main wiper axis 5 being the third pivotal axis) becomes the maximum, and the main wiper 8 is located at the maximum rocking end, the main wiper arm 8 is positioned at the upper reversing position (the hypothetical line in FIG. 1). And, in a case where rocking exceeding the respective pivotal axes 8b, 10a and 5, which are in the same straight line, toward the upper reversing position occurs, the main wiper arm 8 is subjected to a rocking movement from the upper reversing position, which is the maximum reversing position, to the lower reversing position, wherein no rocking toward the upper reversing side is permitted. Therefore, the overrun of the main wiper arm 8 beyond the upper reversing position is regulated. Still further, a state in which the angular speed at the first pivotal axis 8b is decelerated is brought about, whereby the rocking speed of the main wiper arm 8 is decelerated.

In this connection, the nearer the main wiper arm 8 is drawn to the upper reversing position (maximum rocking end), the more the speed thereof is decelerated, and at the upper reversing position, the speed is decelerated to zero. As a result, the corresponding wiper arm 8 is subjected to a large deceleration by which the speed thereof becomes zero toward the upper reversing position, whereby impact due to reversing is sufficiently lightened, and the overrun regulation operates effectively on.

On the other hand, in the present embodiment, with respect to the relationship between the first link 10 and the second link 11, the lower reversing position of the wiper arm 8 is established in a position before the first wiper axis 8b, main wiper axis 5 and second pivotal axis 10a enter an arrayed state where these are disposed in the same straight line from upward to downward (as shown by solid lines in FIG. 1).

In addition, since the first link 10 and the second link 11 are constructed so as to be folded with the second pivotal axis 10a used as a folding point, these links 10 and 11 are disposed in such a state where these links are laminated in the longitudinal direction so that the first link 10 and the wiper axis 5 don't interfere with each other.

In the first embodiment of the invention, which is constructed as described above, the main and sub wiper axes 5 and 6 turns around clockwise and counterclockwise in line with drive of the wiper motor 1, whereby the main and sub wiper arms 7 and 8 reciprocatorily rock to carry out a wiping motion on a window surface. In this case, a reciprocatory reversing mechanism consisting of the first link 10 and the second link 11 is connected to the main wiper arm 8 at the tip end side of the pivotal axis 8a, which is pivotally supported at the vehicle body side so as to rock, via the first pivotal axis 8b, reciprocatory rocking of the main wiper arm 8 can be carried out since the second link 11 executes linked rocking using the corresponding main wiper axis 5 as a fulcrum in line with clockwise and counterclockwise rocking of the main wiper axis 5. And, at this time, as the first link 10 and the second link 11 are drawn near the upper reversing position, the links 10 and 11 are entered into a linked relationship in which the first, second and third pivotal axes 8a, 8b and 10a are located in the same straight line in order. Therefore, since, when the main wiper arm 8 located at the upper reversing position is subjected to wiping inertia and is to overrun, the first link 10 and the second link 11 are entered into a linked relationship in which the respective pivotal axes 8a, 8b and 10a cause the wiper arm 8 to rock to the upper reversing position side beyond the linked relationship in which the axes 8a, 8b and 10b are located in the same straight line, the main wiper arm 8 does not rock beyond the maximum rocking position being the upper reversing position, overrun of the main wiper arm 8 beyond the wiping range can be cut off, whereby the overrun can be regulated. As a result, it is not necessary to take a countermeasure against the overrun into consideration when setting the wiping range of a window surface in advance, and the wiping area can be increased so as to progressively become large to the vicinity of the pillar at the window side.

Also, since the first link 10 and the second link 11 carry out linked rocking so that the first pivotal axis 8a, the second pivotal axis 8b and the third pivotal axis 10a are located in the same straight line as they are drawn near the upper and lower reversing positions, the angular speed of the first pivotal axis 8a is decelerated as the main wiper arm 8 reaches the vicinity of the upper reversing position, whereby the rocking speed of the main wiper arm 8 is decelerated. Resultantly, the inertia force of the main wiper arm 8 at the upper reversing position can be weakened, and the overrun at the corresponding side can also be made small.

Further, in this case, since the wiper apparatus is constructed so that its blade speed is decelerated whilst approaching the upper reversing position and becomes zero when the upper reversing position being the maximum rocking end is reached, the impact due to reversing is decreased to reduce impact noise, whereby the load in reversing, which operates on the respective connection points between the main wiper arm 8, the first link 10 and the second link 11, can be decreased to cause play and wear to be reduced.

Further, since the main wiper arm 8 is constructed so that it can reciprocate and rock by linked rocking of the first link 10 and the second link 11 connected via the first pivotal axis 8b pivotally supported at the tip end side of the pivotal axis 8a while using the pivotal axis 8a, which is pivotally supported at the vehicle body side so as to rock, as a fulcrum, the load in reversing is not concentrated at the wiper axis connection portion as in a prior art wiper apparatus in which the wiper axis is attached integral to the base end portion of the wiper arm, but the load is scattered to the respective connection points, whereby the play and wear at the respective connection portions can be further decreased.

It is needless to say that the invention is not limited to the abovementioned embodiment. That is, the invention may be constructed as in the second embodiment shown in FIG. 4. The embodiment employs a conventionally universal wiper arm 15, wherein while a pivotal axis 16 integrally secured at the base end portion of the corresponding universal wiper arm 15 is pivotally supported at the vehicle body side so as to rock, one end of an auxiliary link 17 is provided integral with the pivotal axis 16 integrally rocking with the wiper arm 15, the first pivotal axis 17a is rotatably supported at the other end of the corresponding auxiliary link 17, and the first link 10 and the second link 11 (not illustrated), which are constructed as in the first embodiment, and a wiper axis are connected to the first pivotal axis 17a. By constructing the second embodiment as described above, the second embodiment can bring about a wiper arm 15 constructed so as to make reciprocation and rocking by the first and second links while being constructed of a universal wiper arm. In addition, since the first link and the second link are established in the same relationship as that in the first embodiment, overrun of the wiper arm at the upper reversing position can be regulated, and at the same time, the rocking speed at the upper reversing position can be decelerated, thereby widening the wiping area by the wiper blade.

Figure 5:
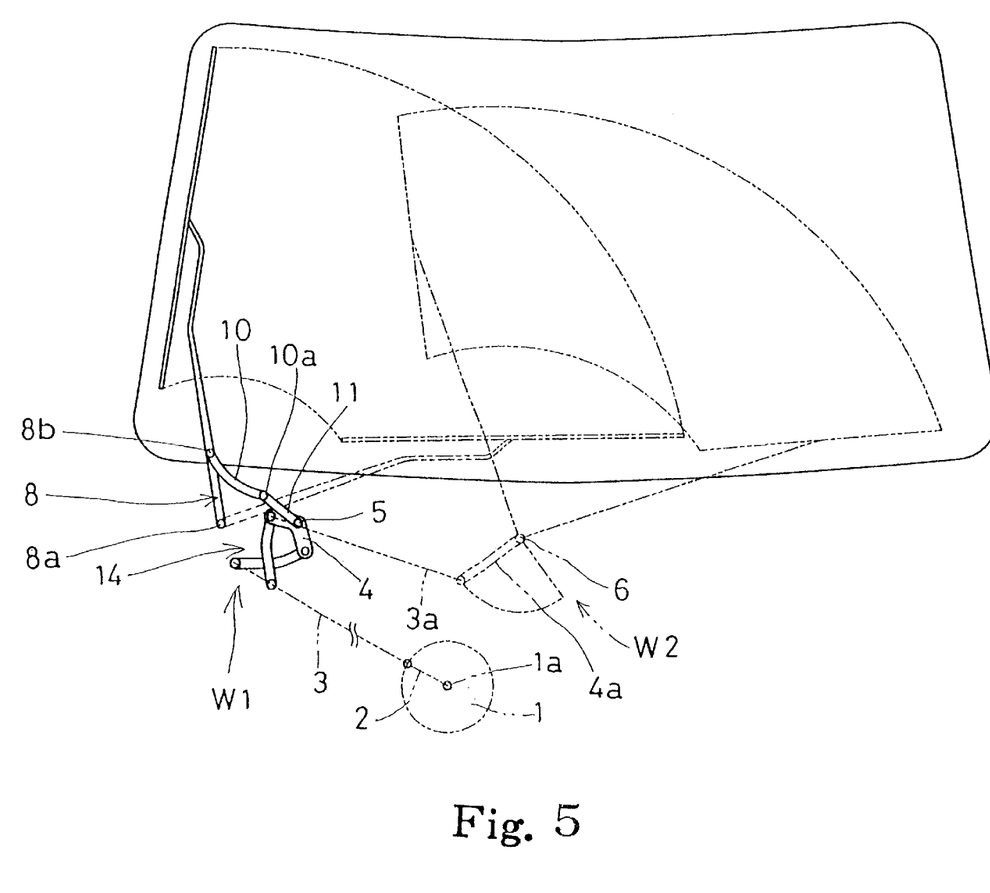
FIG. 5 is a rough front elevational view showing the entire construction of a wiper apparatus according to the third embodiment.
Figure 6:
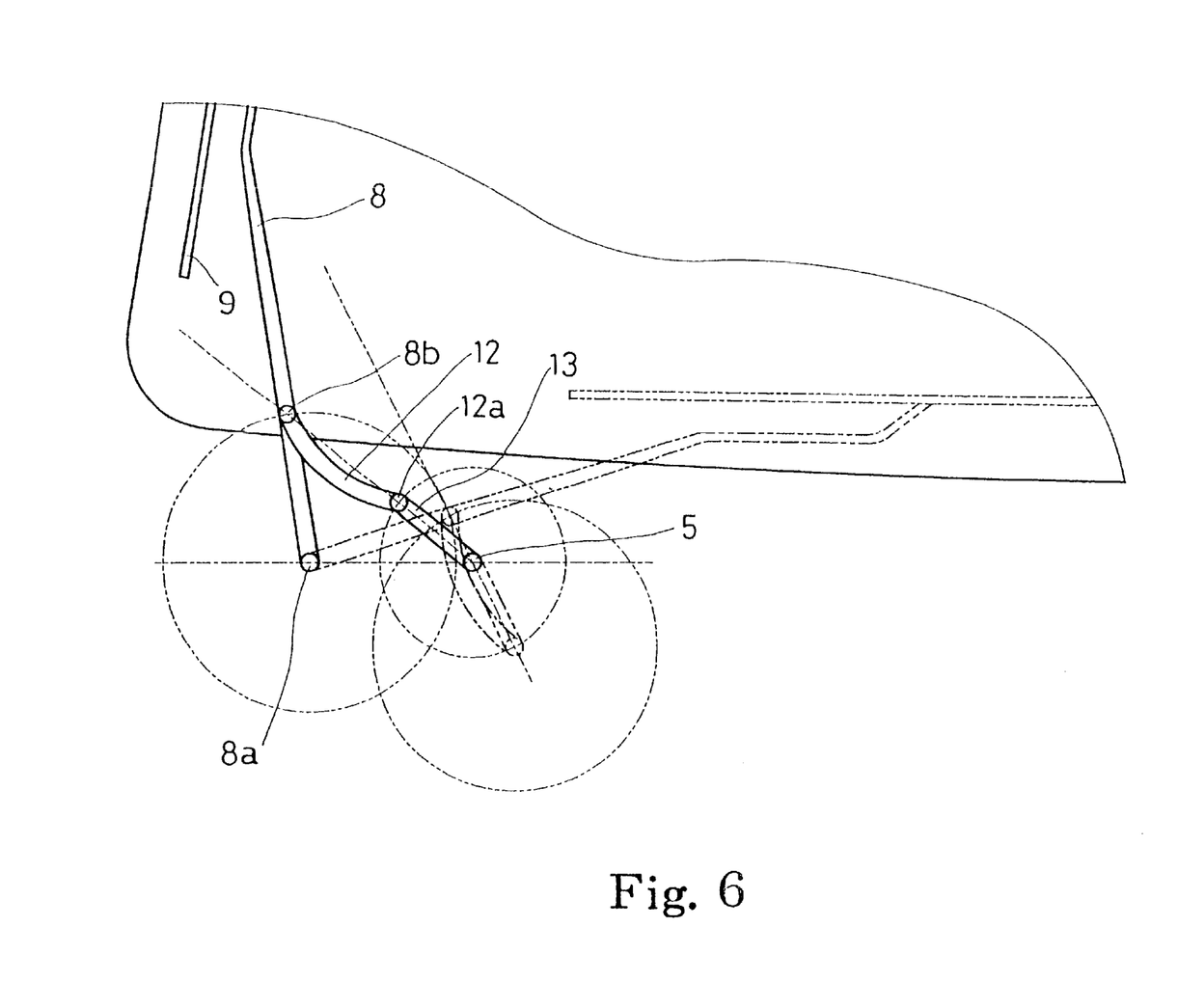
FIG. 6 is an enlarged front elevational view explaining actions of the main wiper apparatus according to the third embodiment.

Also, the invention can be constructed as in the third embodiment shown in FIG. 5 and FIG. 6. This embodiment is the same as the abovementioned first embodiment in that the main wiper arm 8 constituting a main wiper apparatus W1 is provided with a reciprocation rocking mechanism employing the first link 12 and the second link 13. And, in the third embodiment, a so-called cross link mechanism 14 intervenes between the third pivotal axis (wiper axis) 5, by which the second link 13 is pivotally supported at the vehicle body side, and a wiper motor 1, whereby the range of the turning angle of the third pivotal axis 5 is set so as to be widely secured. And, the main wiper arm 8 is established so that it is located at the upper reversing position when the relationship between the first link 12 and the second link 13 becomes such that the first pivotal axis 8b, the second pivotal axis 12a and the third pivotal axis 5 are positioned in the same straight line in order, and so that it is located at the lower reversing position when the relationship becomes such that the first pivotal axis 8b, the third pivotal axis 5 and the second pivotal axis 12a are positioned in the same straight line in order (FIG. 6). Therefore, the overrun of the wiper arm 8 can be regulated at both the upper and lower reversing positions, and the speed of the wiper arm 8 can be decelerated as the wiper arm 8 approaches the upper and lower reversing positions. In this case, a wiper axis 6 constituting the sub wiper apparatus W2 is integrally connected to a sub link arm 4a connected, via a sub link rod 3a, to the main link arm 4 constituting the main wiper apparatus W1

Further, in the embodiment, the first link 10 is formed to be curved, whereby the link rocking is not damaged due to interference of the first link 12 with the main wiper axis 5. Still further, the construction of the first link 10 and the second link 11 can be made thinner in the longitudinal direction.

In addition, in the respective embodiments, although the invention is applied to only the main wiper apparatus of the main and sub wiper apparatuses, it is needless to say that it may be applicable to both the main and sub wiper apparatuses.

Figure 7:
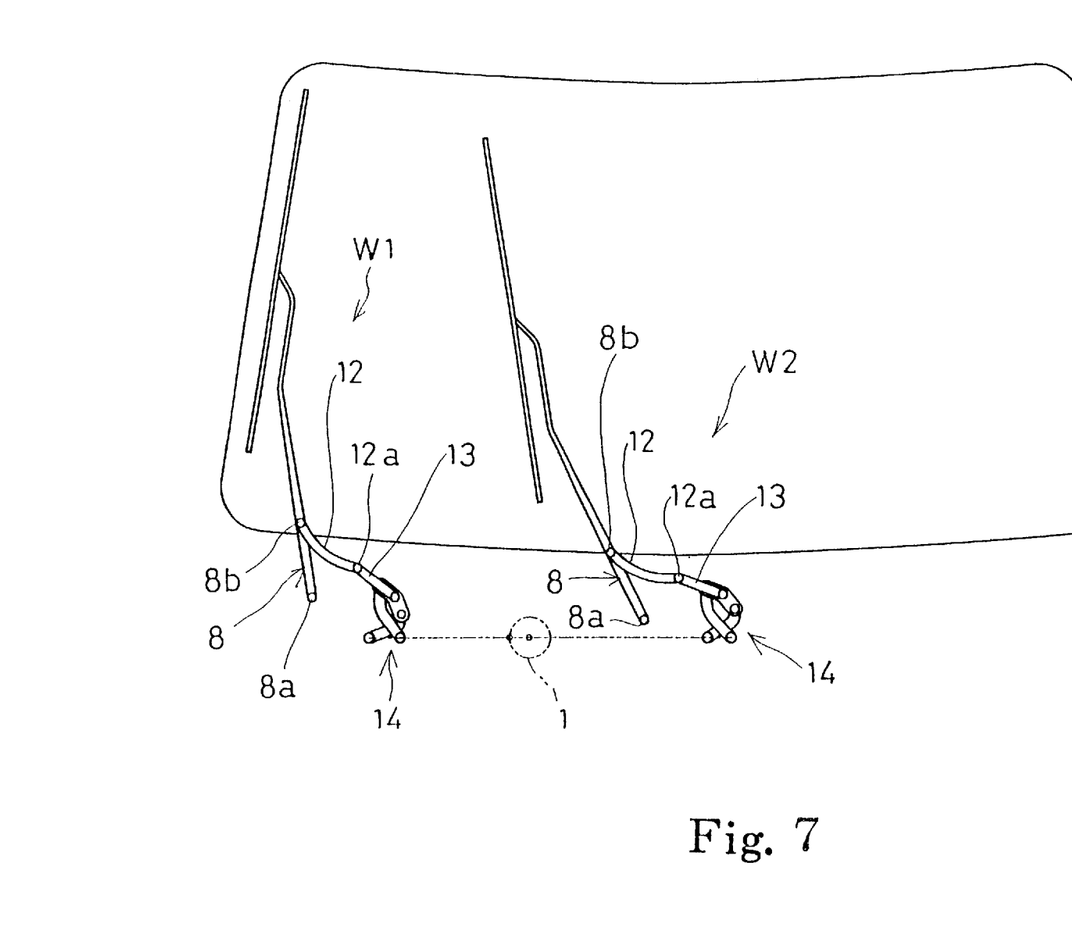
FIG. 7 is a rough front elevational view showing the entire construction of a wiper apparatus according to the fourth embodiment.

As such an example, the invention can be constructed as in the fourth embodiment shown in FIG. 7. In this embodiment, both the main and sub wiper apparatuses W1 and W2 are constructed as in the main wiper apparatus according to the second embodiment.

Also, the embodiment may be constructed so that the main link rod from a wiper motor is pivotally supported at the second pivotal axis, which pivotally supports the first and second links, and the second link is caused to rock by a link motion of the main link rod in line with drive of the wiper motor while using the third pivotal axis pivotally supported at the vehicle body side as a fulcrum.

In addition, the fourth embodiment may be constructed so that the third pivotal axis that pivotally supports the second link at the vehicle body side is made into an output shaft of the wiper motor, the corresponding output shaft is connected integral with the second link, and the wiper arm pivotally supported at the first link side is caused to reciprocate and rock in line with that the second link continuously rotate in one direction while using the motor shaft (third pivotal axis) as a fulcrum in line with one-way rotation of the wiper motor. In this case, since the second link is constructed so as to rotate, it is necessary that the first link is constructed so as not to interference with the motor shaft.

Further, the third pivotal axis may be constructed as an output shaft of the wiper motor which turns clockwise and counterclockwise.

What is claimed is:

1. A wiper apparatus, comprising:

a wiper arm having a tip end and a base end pivotally supported at a wiper arm pivotal axis that is fixed to a vehicle body, the wiper arm has a rocking motion between an upper reversing position and a lower reversing position using the wiper arm pivotal axis as a first fulcrum;

a blade disposed at the tip end of the wiper arm;

a first link having a first end and a second end;

a first pivotal axis pivotally supporting the first end of the first link to the wiper arm;

a second link having a first end and a second end;

a second pivotal axis pivotally supporting the first end of the second link to the second end of the first link;

a third pivotal axis supported to the vehicle body and pivotally supporting the second end of the second link at the vehicle side;

a rocking motion of the second link using the third pivotal axis as a second fulcrum causes the rocking motion of the wiper arm; and a maximum travel limit of the rocking motion of the wiper arm in at least one reversing position is obtained with the first, second and third pivotal axes are positioned in a substantially straight line.

2. A wiper apparatus as recited in claim 1, wherein:

the first pivotal axis is disposed at an intermediate portion of the wiper arm.

3. A wiper apparatus as recited in claim 1, further comprising:

an auxiliary link attached to the wiper arm, the auxiliary link having a rocking motion integral with the rocking motion of the wiper arm; and, the first link is pivotally supported to the wiper arm at the first pivotal axis through the auxiliary link.

4. A wiper apparatus as recited in claim 1, wherein:

the wiper arm is located at the upper reversing position when the first pivotal axis, second pivotal axis and third pivotal axis are positioned in a substantially straight line in that order.

5. A wiper apparatus as recited in claim 4, wherein:

a rocking speed of the wiper arm is decelerated as the wiper arm approaches the upper reversing position.

6. A wiper apparatus as recited in claim 1, wherein:

the wiper arm is located at the lower reversing position when the first pivotal axis, third pivotal axis and second pivotal axis are position in a substantially straight line in that order.

7. A wiper arm rocking mechanism rocking a wiper arm between upper and lower reversing positions about a wiper arm pivotal axis which is supported by a vehicle body, comprising:

a first link having a first end connected to the wiper arm and a second end;

a first pivotal axis pivotally supporting the first end of the first link;

a second link having a first end and a second end;

a second pivotal axis pivotally supporting the first end of the second link to the second end of the first link;

a third pivotal axis supportable by a vehicle body and pivotally supporting the second end of the second link at the vehicle body side;

a rocking motion of the second link about the third pivotal axis causes a rocking motion between the upper and lower reversing positions; and a maximum travel limit of the rocking motion of the wiper arm in at least one reversing position is reached when the first, second and third pivotal axes are positioned substantially in a straight line.

8. A wiper arm rocking mechanism as recited in claim 7, further comprising: an auxiliary link attached to the wiper arm, the auxiliary link having a rocking motion integral with a rocking motion of the wiper arm; and, the first link is pivotally supported to the wiper arm at the first pivotal axis through the auxiliary link.

9. A wiper arm rocking mechanism as recited in claim 7, wherein, at the upper reversing position of the wiper arm, the first pivotal axis, second pivotal axis and third pivotal axis are positioned in a substantially straight line in that order.

10. A wiper arm rocking mechanism as recited in claim 9, wherein, a rocking speed of the wiper arm is decelerated as the wiper arm approaches the upper reversing position.

11. A wiper arm rocking mechanism as recited in claim 7, wherein, at the lower reversing position of the wiper arm, the first link and the first pivotal axis, third pivotal axis and second pivotal axis are positioned in a substantially straight line in that order.

* * * * *